April 9, 1935.  F. A. BARTLETT  1,997,097
FERTILIZING TOOL
Filed Aug. 5, 1933
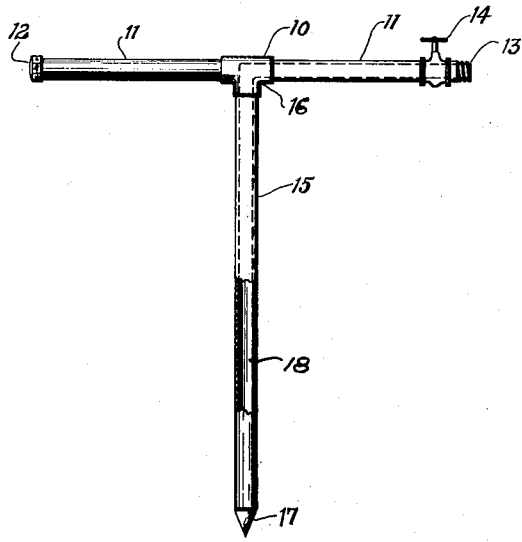
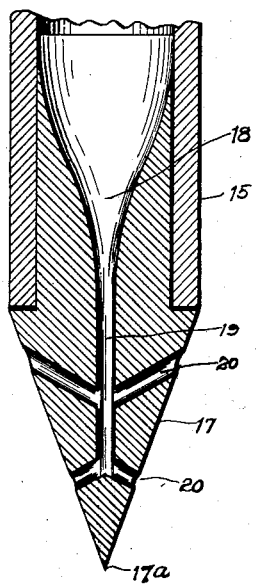
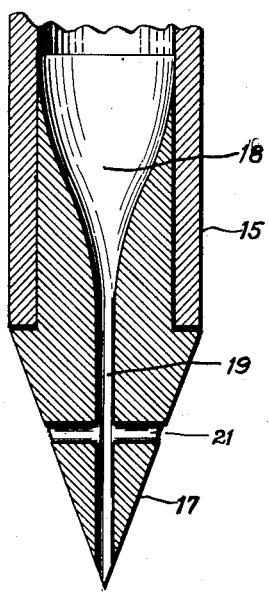
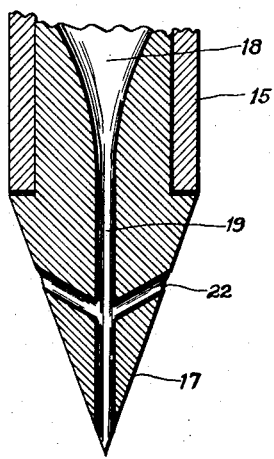
INVENTOR
Francis A. Bartlett
A. H. Golden
ATTORNEY Patented Apr. 9, 1935

1,997,097

UNITED STATES PATENT OFFICE 1,997,097

FERTILIZING TOOL

Francis A. Bartlett, Stamford, Conn., assignor to The F. A. Bartlett Tree Expert Company, Stamford, Conn., a corporation of Connecticut Application August 5, 1933, Serial No. 683,753

5 Claims. (Cl. 47—49)

This invention relates to sub-soil fertilizing method and to a device for applying liquefied fertilizer to the earth at a considerable distance from the surface.

In the fertilizing of the ground around a tree, it is very important to apply the fertilizer at a considerable depth so that the soil will be enriched below its surface and will thus encourage the growing of the roots in a downward direction. If the fertilizing material is applied more closely to the surface of the ground, the roots have a tendency to follow the fertilizer so as to approach the surface and thus weaken the tree.

The art of applying fertilizing materials to the sub-soil has been highly developed over a period of many years, but has never become a commercially desirable and extensively utilized system of fertilizing because the tools for the proper application of fertilizers to the sub-soil have never been thoroughly developed and properly applied. It is the object of this invention to devise a particular instrument especially effective for enriching the sub-soil in an effective manner.

I have found that when chemicals are applied to the sub-soil, they move but slightly in a horizontal direction, and that they tend to gravitate vertically through the soil. Therefore, the application of chemicals to the soil through the ordinary tools of the prior art will allow for merely a vertical and fairly localized seepage and application. It will readily be seen that an effective application of fertilizing material under such conditions would require a considerable number of piercings below the surface of the soil, and even at best, the permeation of the chemicals through the soil would be of very little effect. Also, as chemicals are applied without great pressure, in the prior art, and by instruments incapable of forming spreading liquid streams, the application of liquid chemicals below the surface has in the past been impractical or less effective than properly warranted.

It is the further specific object of my invention to devise a system and a tool for enriching the sub-soil which comprises the utilization of soluble nitrate materials fed through means of a conducting pipe, and a nozzle having an orifice effect created by the presence of a supply passage of considerably smaller cross section than the passage of the main conducting pipe of my tool. The invention relates further to the provision of a plural number of feed passages which derive their fertilizing material and pressure from the main feed passage at the point where its orifice effect is very considerable. A further refinement of my invention involves the utilization of feed passages of relatively great length so that these passages will be able to form and influence the streams issuing therefrom, so that the streams will retain their consistency and pressure for a considerable distance after they have left the tool.

In the prior art, while feed passages have been used, they have not been used in such form as to derive their pressure from a supply passage having an orifice effect with high pressure, and they have not been of such considerable length that they influenced the streams issuing therefrom to maintain their consistency and pressure for a considerable distance. It will be quite obvious that the rapid flow and the consistency of the streams, as applied by my invention, will give considerable spread to the movement of the fertilizer so that its flow through the soil will be horizontal and then vertical, whereby there is produced the greatest possible fertilizing effect.

For a further description of my invention, I shall now refer to the drawing in which the several figures illustrate a particular embodiment of my invention. I wish to have it understood, however, that while my invention is of relatively narrow scope as applied to a highly developed field, it nevertheless discloses a particular commercial application which has been achieved only after considerable study so as to produce a commercial effect very much desired in the industry, and that I feel myself entitled to claims which will protect all such variations and equivalents of my invention as will readily occur to those skilled in the art.

In the drawing, Fig. 1 is a partial section and elevation of my invention. Fig. 2 is a detail of the lower portion of the tool showing more particularly the pressure applying tip. Fig. 3 shows a modification of the invention of Fig. 2, while Fig. 4 shows still a further modification.

Referring now more particularly to the drawing, reference numeral 10 represents my tool which comprises the joined horizontal pipe members 11 closed off by the cap 12 at one end and carrying the threaded hose connection 13 at the other end, controlled by the valve 14. The vertical pipe member 15 is connected by the elbow joint 16 to the horizontal pipe members 11 and the hardened cast solid nozzle 17 preferably is driven into the end of the pipe member 15 as is best illustrated in Figs. 2, 3, and 4, in which the various modifications are shown. Naturally, other ways of securing the tip in the pipe 15 may be devised.

The nozzle tip 17 is sharpened as at 17a so that as pressure is applied to the horizontal pipe arms 11, the pipe 15 and the tip will be driven into the soil.

The fertilizer is usually some soluble nitrogenous material which is carried through the pipe member 15 at a pressure of about 150 lbs. and then enters the imperforate supply passage 18 of the tip 17. The passage is gradually tapered down to a narrowed passage 19 so that an orifice effect is obtained in the passage 19 accompanied by increased and relatively great pressure. Leading into the orifice effect portion of the supply passage 18 are a series of feed passages 20 of substantial length formed in the tip 17. These passages are not merely holes in the outer wall of a tip as in the prior art, but are rather of substantial length. Each of these feed passages is adapted to receive material only from the orifice portion 19 of the supply passage 18. This material will, therefore, be delivered at considerably high pressure, and is adapted to descend forth in the direction of the feed passages at the same high pressure.

Due to the fact that the feed passages 20 are of relatively substantial length and are really bores of regular circular contour in the otherwise solid cast nozzle 17, they will form the streams of water into substantial liquid streams having maintained force and consistency so as to get directed streams of considerable force which will tend to carry the liquid horizontally after it has emerged from the nozzle, so as to spread the fertilizer over a relatively large area.

Figs. 3 and 4 show feed passages 21 and 22 respectively which are inclined in a different relation to the vertical passage 19 so as to produce different effects, depending upon the soil which is to be fertilized.

I claim:

1. In a device of the class described, a pipe member adapted to transmit a fertilizing fluid to the sub-soil, a removable tip of solid cast metal carried at the end of said pipe member and sharpened to permit said member to be driven into the ground, said solid tip having a series of feed bores leading to an imperforate supply bore which is formed in said tip, said supply bore being adapted to lead from said pipe member and to be gradually tapered into a relatively narrow portion where said feed bores communicate therewith, said supply bore and feed bores forming an orifice effect, and said feed bores being of substantial length and inclined relatively to the vertical whereby to form substantial liquid streams having maintained force and consistency, whereby to contribute considerable horizontal spread to the fertilizing material.

2. In a device of the class described, a pipe member adapted to transmit a fertilizing fluid under pressure, a removable tip of solid cast metal carried at the end of said pipe member and to permit said tip and pipe to pierce the earth a substantial distance, said tip having an imperforate supply bore adapted to lead into said pipe, said supply bore leading into a pressure bore being gradually tapered and of substantial length and substantially smaller in cross section than said pipe and adapted to create an orifice effect relatively to said supply bore, said solid tip having a series of feed bores of small diameter leading from said pressure and orifice effect creating bore, said feed bores being of substantial length and inclined relatively to the vertical whereby to form substantial liquid streams having maintained force and consistency, whereby to contribute considerable horizontal spread to the fertilizing material.

3. In a device of the class described, a pipe member adapted to transmit a fertilizing fluid under pressure, a removable tip of solid cast metal carried at the end of said pipe member and sharpened to permit said tip and pipe to pierce the earth a substantial distance, said tip having an imperforate supply bore adapted to lead into said pipe, said tip having also a pressure bore of substantial length and substantially smaller in cross section than said imperforate supply bore and leading from said supply bore whereby to create an orifice effect relatively to said supply pipe, said solid tip having also a series of feed bores of relatively small diameter leading from said pressure and orifice creating bore, said feed bores being adapted to receive the orifice created pressure from said pressure bore and to feed the fluid to the soil, said feed bores being of substantial length and inclined relatively to the vertical whereby to form substantial pressure streams having maintained force and consistency whereby to contribute considerable horizontal spread to the fertilizing fluid.

4. A fertilizing tool having a horizontal pipe handle adapted to transmit a fertilizing fluid, a vertical pipe member joined to said horizontal member to receive fluid therefrom, a removable tip member formed of solid cast metal carried by said vertical pipe member and sharpened to permit said tip and pipe to pierce the earth as pressure is applied to said horizontal handle member, said tip having an imperforate supply bore adapted to lead into said pipe, said supply bore tapering into a pressure bore of relatively small diameter and extending a substantial distance in said pipe and adapted to create an orifice effect relatively to said supply pipe, said solid tip having a series of feed bores of small diameter leading from said pressure and orifice effect creating bore, said feed bores being of substantial length and inclined relatively to the vertical, whereby to form substantial liquid streams having maintained force and consistency, whereby to contribute considerable horizontal spread to the fertilizing material.

5. In a device of the class described, a pipe member adapted to convey a fertilizing fluid, a hardened removable tip member of cast solid cross section carried at the end of said pipe member whereby it may be driven into the ground, said tip having an internal imperforate supply passage whereby to receive material from said pipe member, said tip having also bored pressure passages of small diameter as compared with the pipe member and leading from said supply passage to the outside of said tip, said passages being inclined to the vertical and of substantial length and adapted to create an orifice effect and to form substantial and directed streams adapted to maintain their force and consistency, whereby to give considerable spread to the feeding of the fertilizing fluid therethrough.

FRANCIS A. BARTLETT.

CERTIFICATE OF CORRECTION.

Patent No. 1,997,097.  April 9, 1935.

FRANCIS A. BARTLETT.

It is hereby certified that error appears in the printed specification of the above numbered patent requiring correction as follows: Page 2, first column, line 62, claim 2, after "and" insert the word sharpened; and line 67, strike out the words "being gradually tapered and" and insert the same before "leading" in line 66, of said claim; and that the said Letters Patent should be read with these corrections therein that the same may conform to the record of the case in the Patent Office.

Signed and sealed this 25th day of June, A. D. 1935.

Bryan M. Battey (Seal)  Acting Commissioner of Patents.